United States Patent
Li et al.

(10) Patent No.: US 7,616,704 B2
(45) Date of Patent: Nov. 10, 2009

(54) BROADBAND MULTICARRIER TRANSMITTER WITH SUBCHANNEL FREQUENCY DIVERSITY FOR TRANSMITTING A PLURALITY OF SPATIAL STREAMS

(75) Inventors: Qinghua Li, Sunnyvale, CA (US); Xintian E Lin, Palo Alto, CA (US); Alexei V Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 967 days.

(21) Appl. No.: 11/075,030

(22) Filed: Mar. 8, 2005

(65) Prior Publication Data

US 2006/0203935 A1 Sep. 14, 2006

(51) Int. Cl.
H04L 27/00 (2006.01)
H04L 27/28 (2006.01)
H04B 7/02 (2006.01)

(52) U.S. Cl. .................. 375/299; 375/260; 375/267

(58) Field of Classification Search ............... 375/260, 375/261, 267, 298, 299; 455/91, 101, 102, 455/103, 112, 118; 370/57, 69.1, 120, 281, 370/296, 302, 343, 437, 442, 465, 478, 480, 370/481
See application file for complete search history.

(56) References Cited

U.S. PATENT DOCUMENTS

| | | | |
|---|---|---|---|
| 6,927,728 B2 * | 8/2005 | Vook et al. ............ | 342/377 |
| 6,952,454 B1 * | 10/2005 | Jalali et al. ............ | 375/260 |
| 7,324,605 B2 * | 1/2008 | Maltsev et al. ......... | 375/299 |
| 7,394,858 B2 * | 7/2008 | Sadowsky et al. ...... | 375/260 |
| 2003/0043732 A1 | 3/2003 | Walton et al. | |
| 2005/0013279 A1 * | 1/2005 | Hwang et al. .......... | 370/343 |
| 2005/0058212 A1 * | 3/2005 | Shao ..................... | 375/260 |
| 2005/0058217 A1 * | 3/2005 | Sandhu et al. ......... | 375/267 |
| 2005/0152266 A1 * | 7/2005 | Hwang et al. .......... | 370/210 |
| 2005/0157803 A1 * | 7/2005 | Kim et al. .............. | 375/260 |
| 2006/0104377 A1 * | 5/2006 | Chimitt et al. ......... | 375/261 |
| 2006/0104379 A1 | 5/2006 | Li et al. | |

(Continued)

FOREIGN PATENT DOCUMENTS

WO WO 2006/096880 A2 9/2006

OTHER PUBLICATIONS

"802.16e™—IEEE Standard for Local and Metropolitan Area Networks—Part 16: Air Interface for Fixed and Mobile Broadband Wireless Access Systems, Amendment 2: Physical and Medium Access Control Layers for Combined Fixed and Mobile Operation in Licensed Bands and Corrigendum1", *IEEE Std. 802.16e-2005 and IEEE Std. 802.16™-2004/Cor1-2005 (Amendment and Corrigendum to IEEE 802-16-2004)*, (2006), 864 pgs.

(Continued)

*Primary Examiner*—Tesfaldet Bocure
*Assistant Examiner*—Lawrence B Williams
(74) *Attorney, Agent, or Firm*—Schwegman, Lundberg & Woessner, P.A.; Gregory J. Gorrie

(57) ABSTRACT

A multicarrier transmitter assigns for each of a plurality of spatial channels, sets of the constellation symbols to subcarriers of each subchannel. Constellation symbol assignments to the subchannels are circularly rotated among some of the spatial channels so that subchannels use different sets of subcarriers for each spatial channel for enhanced frequency diversity.

24 Claims, 5 Drawing Sheets

U.S. PATENT DOCUMENTS

2006/0222091 A1* 10/2006 Rhodes .................. 375/260
2006/0223460 A1   10/2006 Himayat et al.
2008/0232449 A1*  9/2008 Khan et al. ............. 375/220

OTHER PUBLICATIONS

Hara, S., et al., "Capacity Enhancement by Virtual Subcarrier Assignment for OFDM-Based Wireless Systems", *IEEE 59th Vehicular Technology Conference (VTC-Spring, 2004)*, (May 2004), 17-19.

Jia, Y., et al., "Virtual Subcarrier Assignment With Multiple Subcarrier Puncturing for Spatial Filtering of OFDM Signals", *Proceedings, 2004 Joint Conference of the 10th Asia-Pacific Conference on Communications and the 5th International Symposium on Multi-Dimensional Mobile Communications*, vol. 2, (2004), 937-941.

Yaghoobi, Hassan, "Scalable OFDMA Physical Layer in IEEE 802.16 WirelessMAN", *Intel Technology Journal*, vol. 8, Issue 3, (2004), 201-212.

* cited by examiner

BROADBAND MULTICARRIER TRANSMITTER WITH SUBCHANNEL FREQUENCY DIVERSITY FOR TRANSMITTING A PLURALITY OF SPATIAL STREAMS

TECHNICAL FIELD

Some embodiments of the present invention pertain to multicarrier wireless communications, and some embodiments pertain to the transmission of multiple data streams over a plurality of spatial channels.

BACKGROUND

Some multicarrier communication systems divide a multicarrier communication channel into several subchannels. Each subchannel may use a subset of the subcarriers of the multicarrier channel. Some of these multicarrier communication systems employ antenna diversity by transmitting each of the several subchannels over one of several spatial channels defined by multiple antennas. One problem with these multicarrier systems is that the subchannels use the same frequency subcarriers in each spatial channel. This lack of frequency diversity can reduce the performance of a particular subchannel especially when it has one or more problematic subcarrier frequencies. This lack of frequency diversity may also affect one user more than other users. Thus there are general needs for increasing frequency diversity between subchannels of different spatial channels in multicarrier MIMO systems.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
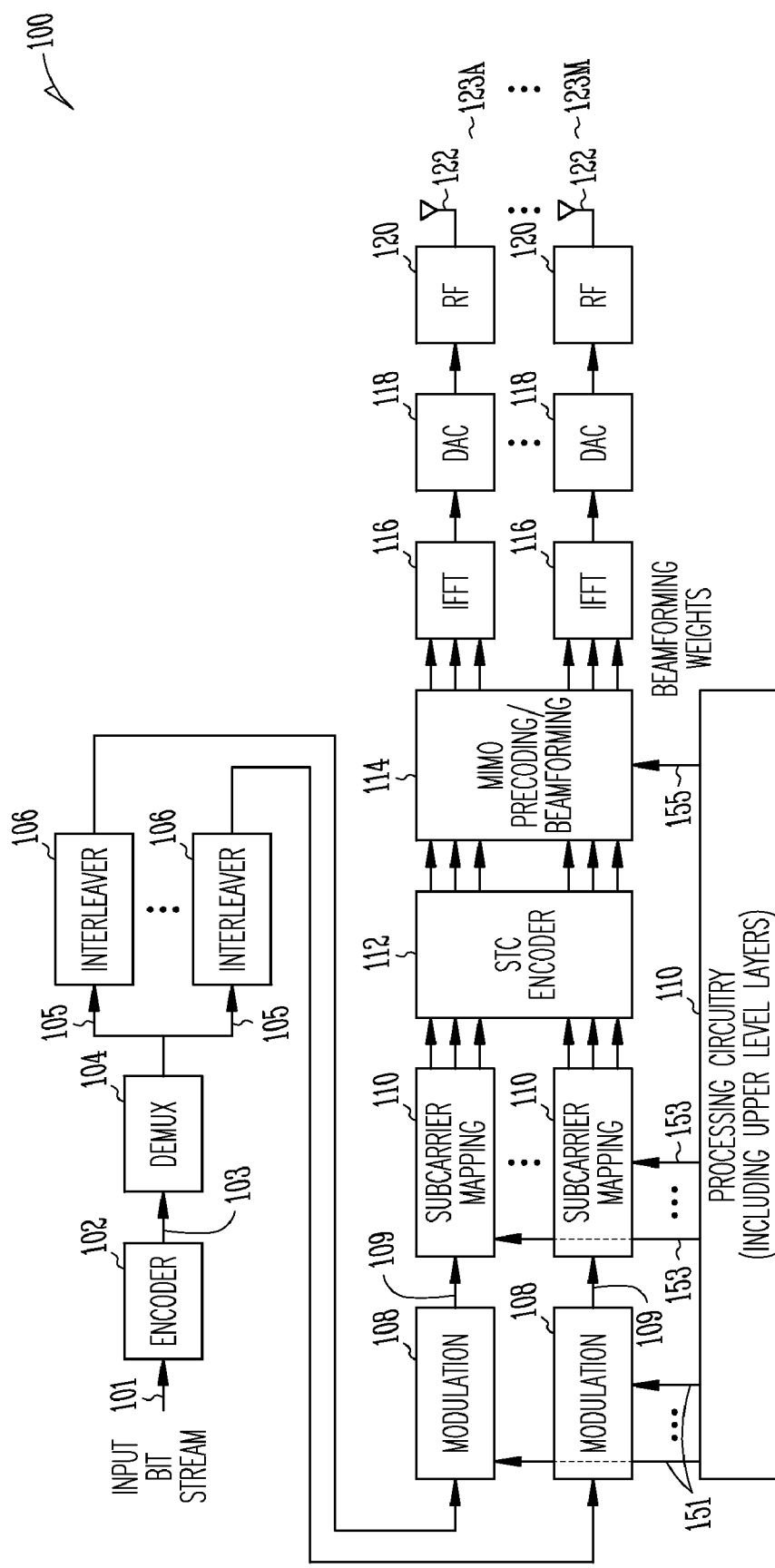
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 may generate signals for transmission over a broadband multicarrier communication channel from input bit stream 101. In these embodiments, multicarrier transmitter 100 may transmit multicarrier signals, such as orthogonal frequency division multiple access (OFDMA) signals, over a plurality of spatial channels 123 using two or more transmit antennas 122.

The multicarrier communication channel may be a broadband multicarrier communication channel and may comprise one or more time slots and a set of subcarriers, possibly all subcarriers, of the multicarrier broadband communication channel. In some embodiments, a broadband channel may comprise up to 1024 or more subcarriers, although the scope of the invention is not limited in this respect. A subchannel may comprise one or more of the time-slots and a subset of the subcarriers of a broadband channel allowing the broadband channel to be divided into a plurality of subchannels. Subchannels that use two or more consecutive time slots may be referred to concatenated subchannels.

In some embodiments, a subchannel may be assigned to or associated with a particular receiving station or user. In these embodiments, the particular receiving station receives multicarrier signals transmitted by multicarrier transmitter 100 on the subcarriers of the assigned subchannel through each spatial channel.

In some embodiments, each subchannel may have a different number of subcarriers, although this is not a requirement. In some embodiments, the subcarriers of a subchannel may be adjacent subcarriers; however this is not a requirement, as in other embodiments, the subcarriers of a subchannel are not contiguous. A subchannel may be transmitted on more than one of the spatial channels. Each spatial channel 123 may use the same subcarrier frequencies and may be associated with either a different transmit antenna 122 or different beamforming weights 155 to take advantage to the antenna diversity associated with the different transmit antennas 122. In some embodiments, a spatial stream may refer to signals designated for transmission by a single transmit antenna. In other embodiments, a spatial stream may refer to signals designated for transmission by multiple antennas by the application of beamforming weights. The number of subchannels as well as the subchannel bandwidth (i.e., related to number of subcarriers that each subchannel uses) may vary as the number of users and their bandwidth requirements change.

Multicarrier transmitter 100 may comprise encoder 102 to encode input bit stream 102 and generate encoded bits 103. In some embodiments, encoder 102 may be forward error correcting (FEC) encoder and may generate FEC encoded blocks of bits.

Multicarrier transmitter 100 may also comprise demultiplexer (demux) 104 to assign encoded bits 103 to one of a plurality of data streams 105. In some embodiments, demultiplexer 104 may sequentially assign an FEC encoded block of bits to each data stream 105. Although FIG. 1 illustrates two data streams 105, the scope of the invention is not limited in this respect. In some embodiments, transmitter 100 may include circuitry for processing two or more data streams 105, and in some embodiments, may include circuitry to process up to four or more data streams 105.

Multicarrier transmitter 100 may also comprise interleavers 106 associated each data stream 105 to perform an interleaving operation on encoded bits 103. In some embodiments, each of interleavers 106 may perform a block interleaving operation on an FEC encoded block of bits.

Multicarrier transmitter 100 may also comprise modulators 108 associated with each data stream 105 to generate constellation symbols, such as quadrature amplitude modulated (QAM) symbols, for each data subcarrier of a multicarrier communication channel. The multicarrier communication channel may be broadband multicarrier communication channel. In some embodiments, modulators may generate constellation signals based on modulation level inputs 151 which may assign different modulation levels (e.g., number of encoded bits per constellation symbol) to the different data streams 105. This is discussed in more detail below.

Multicarrier transmitter 100 may also comprise subcarrier mapping circuitry 110 associated with each spatial channel to map constellation symbols to subcarriers and time-slots of each subchannel for each spatial channel. As its output, each of subcarrier mapping circuitry 110 may provide a constellation symbol for each subcarrier and time slot of one spatial channel. Subcarrier mapping circuitry 110 may rotate or shift subcarrier indexes and/or time slot indexes among spatial channels in accordance with subcarrier mapping information 153, although the scope of the invention is not limited in this respect. The operation of subcarrier mapping circuitry 110 is described in more detail below.

In some embodiments, a distinct mapping from QAM symbols to physical subcarrier and/or physical time slots is generated for each spatial channel. The generation of distinct mapping may be parameterized. For example, in some embodiments, the mappings for each spatial channel may be circularly shifted by known amount in to generate the mappings for the next spatial channel. The mapping parameter may be the amount shifted. For example, in some other embodiments, an interleaving operation may be employed to change the mapping. In these embodiments, the mapping may be 1, 2, 3, 4 to 1, 2, 3, 4 for the first channel and an interleaver (e.g., 2, 4, 1, 3) may be employed for the second spatial channel. The output sequence of the mapping for the first channel, (e.g., 1, 2, 3, 4) may be permuted by the interleaver as 2 4 1 3. Thus, the mapping for the second channel is 1, 2, 3, 4 to 2, 4, 1, 3. In some embodiments, the output sequence of the mapping for the second channel may be interleaved further by the interleaver in order to generate the mapping for the third channel, where the parameters are the interleaver. The mapping for the third channel is thus 1, 2, 3, 4 to 4, 3, 2, 1. The generation of the mapping may be viewed as iterative in the two examples above. Namely, the mapping for the next channel can be generated by a constant transformation of the mapping for the current channel. Some other embodiments of the present invention may use other parametric ways to iteratively (and/or simultaneously) generate distinct mappings.

In some embodiments, the mapping generating by mapping circuitries 110 may be known to the receiver and/or may be provided to the receiver. In some embodiments, the mappings may be sent to the receiver in a header of packets such as reply packets, which may be set to the receiver in a single-input single-output channel, although the scope of the invention is not limited in this respect. For example, in some embodiments, the relative rotation/shift amount between two adjacent streams may be a constant (e.g., 24 subcarriers). For example, in some embodiments, the rotation/shift amount may be a function of some parameters known by the receiver. For example, the shift amount for the i-th stream in addition to the shift amount for the (i−1)-th stream may be the number of subcarriers in the i-th (concatenated) subchannel. In some IEEE 802.16(d) and (e) embodiments, the number of subcarriers of each subchannel may be a function of modulation level and FEC code rate. In some other embodiments, the additional shift amount may be the maximum number of physical subcarriers in a subchannel, which depends on the FEC code rate, modulation level, and the channel permutation scheme. Some examples of channel permutation schemes may include partially-used subchannel (PUSC) utilization, fully-used subchannel (FUSC) utilization, and advanced modulation and coding (AMC), although the scope of the invention is not limited in this respect. In the header in packets to the receiver, a switch bit may be included to indicate whether a shift or distinct mapping is employed.

In some embodiments, one data stream may be sent through multiple spatial channels and each spatial channel may have a distinct mapping. No one-to-one correspondence between modulators 108 and subcarrier mappers 110 is required and in some embodiments, the number of subcarrier mappers 110 may be greater than the number of modulators 108. One data stream, however, may be sent by one spatial channel when different mappings are applied to each spatial channel. When one data stream is sent by multiple spatial channels, the mapping may be same for each of the multiple spatial channels.

In some embodiments, different data streams may carry different code bits. Each spatial channel may be formed by either one transmit antenna or multiple transmit antennas with beamforming weights.

Multicarrier transmitter 100 may also comprise a space-time-coder (STC) encoder 112 which may perform a coding operation on the constellation symbols provided by subcarrier mapping circuitries 110. In some embodiments, STC encoder 110 may add redundant information to input symbols 109 and in some embodiments, the number of output streams may be greater than the number of input streams. In some embodiments, STC encoder 112 may refrain from adding redundant information to input symbols 109 and may pass the symbols provided by mapping circuitries 110 without any processing. In some embodiments, one data stream is sent by one spatial channel; however, STC codes may be used to add redundancy information and to increase the number of streams. For example, an Alamouti code may be used which takes one input data stream and generates two output streams and the two outputs use two spatial channels for transmission. In this way, the number of data streams may not necessarily be equal to the number of spatial channels. However, in some embodiments, using STC encoder 112 may require the mapping to be unchanged for two spatial channels in order to make the code work.

In some embodiments, STC encoder 112 may add redundant information to the input QAM symbols and may generate more symbols than the number of input QAM symbols. For example, for one input data stream and four transmit antennas, STC encoder 112 may generate four symbols for each input symbol. This may be referred to as rate four STC encoding. In another example, there may be four input data streams 109 and four transmit antennas 122. STC encoder 112 may do nothing to the input symbols and send them out on four streams. This may be referred to as rate one STC encoding. In another example in which there are three input data streams 109 and four transmit antennas 122, STC encoder 112 may generate four symbols for each three input symbols. This may be referred to as rate three STC encoding. When there is one input stream and there are multiple output streams, this may be referred to as a pure diversity mode. When there are more than one input stream and the STC does nothing to the input symbols, this may be referred to as a pure spatial multiplexing mode.

Multicarrier transmitter 100 may also comprise multiple-input multiple-output (MIMO) precoding circuitry 114, which may operate as a frequency-domain beamformer to apply beamformer weights 155 in the frequency-domain to each subcarrier to allow beamforming.

Multicarrier transmitter 100 may also comprise inverse fast Fourier transform (IFFT) circuitry 116 associated with each spatial channel 123 to generate time-domain signals from the frequency-domain constellation symbols associated with each of the subcarriers. In some embodiments, each of IFFT circuitry 116 may generate an OFDM symbol for each time slot from the subcarriers of the multicarrier communication channel.

Multicarrier transmitter 100 may also comprise digital-to-analog conversion (DAC) circuitry 118 for each spatial channel to generate analog signals from the time-domain digital signals provided by IFFT circuitry 116.

Multicarrier transmitter 100 may also comprise radio-frequency (RF) transmitter circuitry 120 associated with each spatial channel 123 to generate signals for transmission by an associated one of antennas 122.

Multicarrier transmitter 100 may also comprise processing circuitry 150 which may generate modulation levels 151 for each spatial channel, may generate subcarrier mapping information 153 for subcarrier mappers 110, and may provide beamformer weights 155 to MIMO precoding circuitry 114. In some embodiments, processing circuitry 150 may include one or more upper level layers (i.e., layers above the physical (PHY) layer), although the scope of the invention is not limited in this respect.

In some wideband systems, including some systems that operate in accordance with the IEEE 802.16(e) standards, the mapping of constellation symbols to the actual physical subcarriers is the same for all spatial streams or spatial channels. In other words, the same subcarriers are mapped to the same subchannel of each spatial channel. Consequently, the subchannel structure is the same for all spatial channels, which are partitions or groupings of subcarriers and time slots. In a vertical MIMO mode, consecutive codebits may be sequentially filled into subchannels in both frequency space, and time. For example, when spatial channel one has subchannels 1, 2, . . . N, and spatial channel two has the exact same partition structure, (i.e. subchannel 1, 2, . . . N), consecutive codebits fill the subchannels in the order: subchannel 1 in spatial channel one, subchannel 1 in spatial channel two, subchannel 2 in spatial channel one, subchannel 2 in spatial channel two, etc. Because it is desirable to distribute adjacent codebits to different subcarriers and different spatial channels in order to help maximize diversity in both frequency and space, the constellation symbol to subcarrier mapping described above doesn't help maximize this diversity.

Some embodiments of the present invention described below help maximize the diversity gain by allowing the mapping to vary across spatial channels. For example, the mapping of all data subcarriers for spatial channel two may be circularly shifted by the number of subcarriers in subchannel one. Although the filling order of subchannels may be as before, adjacent subchannels in the filling sequence are physically located on different sets of subcarriers.

Some embodiments of the present invention may provide improved frequency diversity for consecutive codes bits because any particular subchannel may use different subcarrier frequencies within different spatial channels providing for additional frequency separation between consecutive codebits. Some embodiments of the present invention may provide improved spatial diversity.

In some embodiments, modulator 108 may generate for each of a plurality of data streams 105 a set of constellation symbols for each of a plurality of frequency subchannels based on a number of subcarriers associated with each subchannel. Subcarrier mapping circuitry 110 may assign, for each of a plurality of spatial channels 122, sets of the constellation symbols to the subcarriers of each subchannel. Subcarrier mapping circuitry 110 may circularly rotate assignments among the subcarriers of some spatial channels so that corresponding subchannels use different sets of subcarriers on some spatial channels.

In some embodiments, subcarrier mapping circuitry 110, as part of the circular rotation, may shift subcarrier assignments within the spatial channels of at least some but less than all spatial channels by an increasing amount. In these embodiments, the increasing amount may be at least as great as a number of subcarriers comprising a first subchannel, although the scope of the invention is not limited in this respect. In some embodiments, each subchannel may comprise a subset of frequency subcarriers of a multicarrier communication channel, each subchannel may be a concatenated subchannel comprising two or more time slots, and each time slot may corresponding to an orthogonal frequency division multiplex access (OFDMA) symbol time. In these embodiments, subcarrier mapping circuitry may assign the constellation symbols of each of the subchannels to the time slots to increase time-slot diversity within an associated subchannel.

Figure 2A:
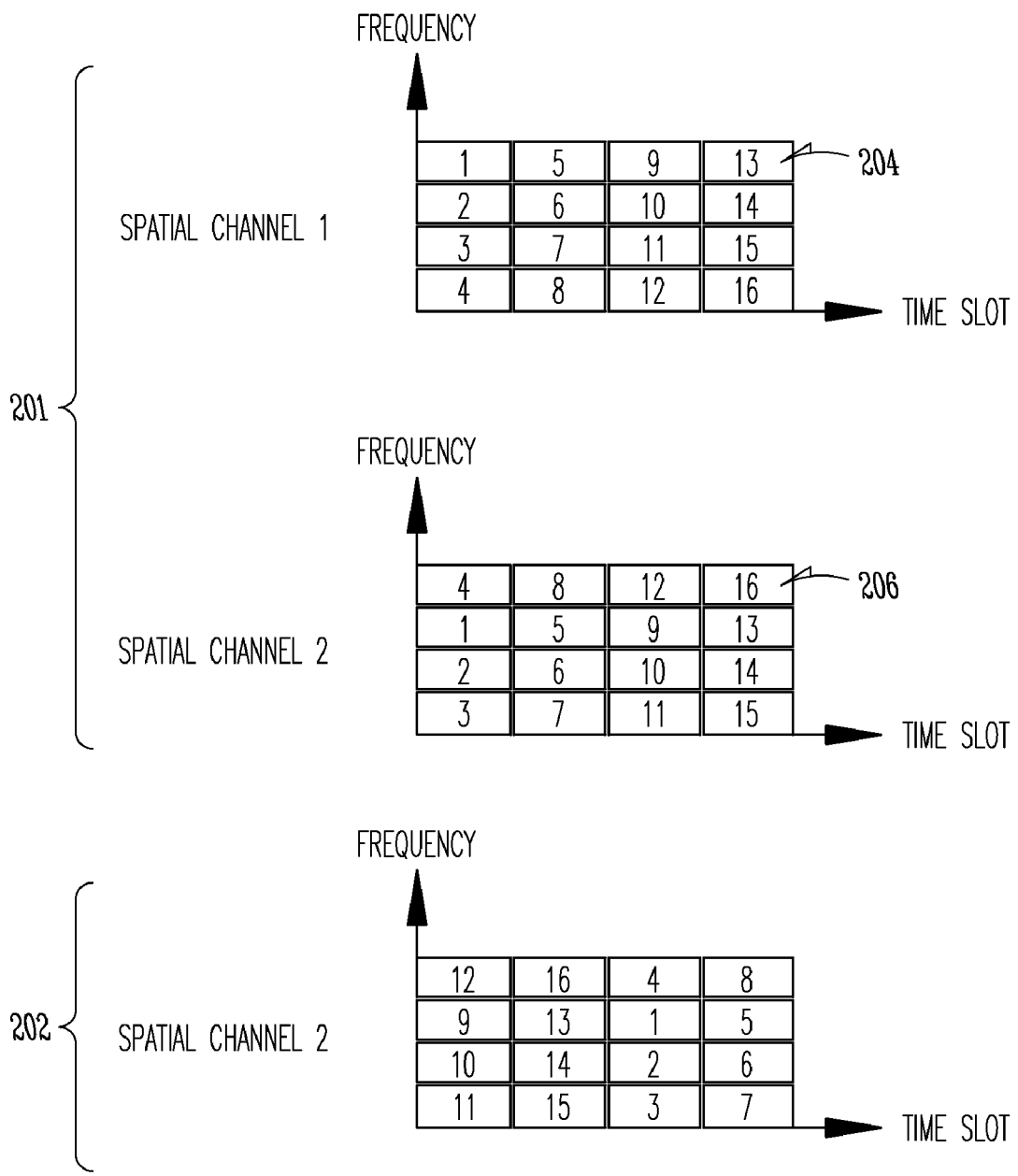
FIGS. 2A and 2B illustrate spatial channel structures in accordance with some embodiments of the present invention.
Figure 2B:
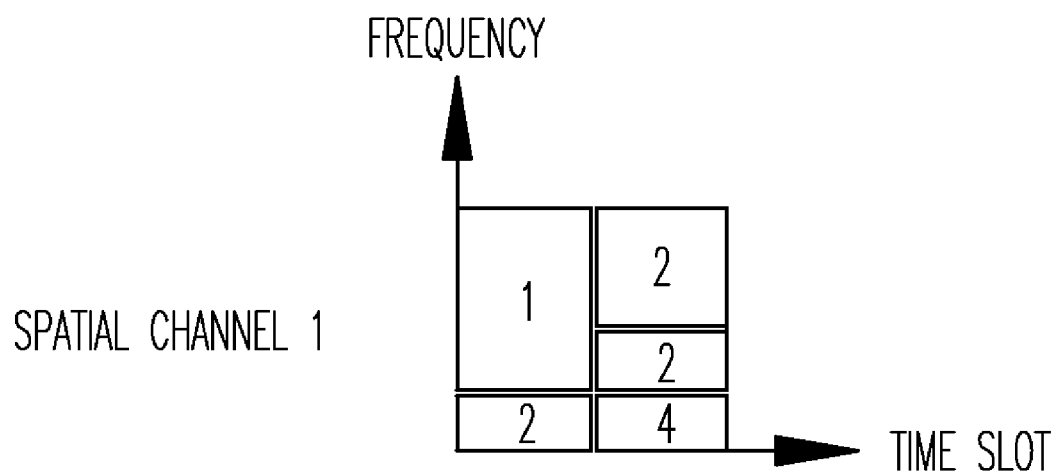
Figure 2B:
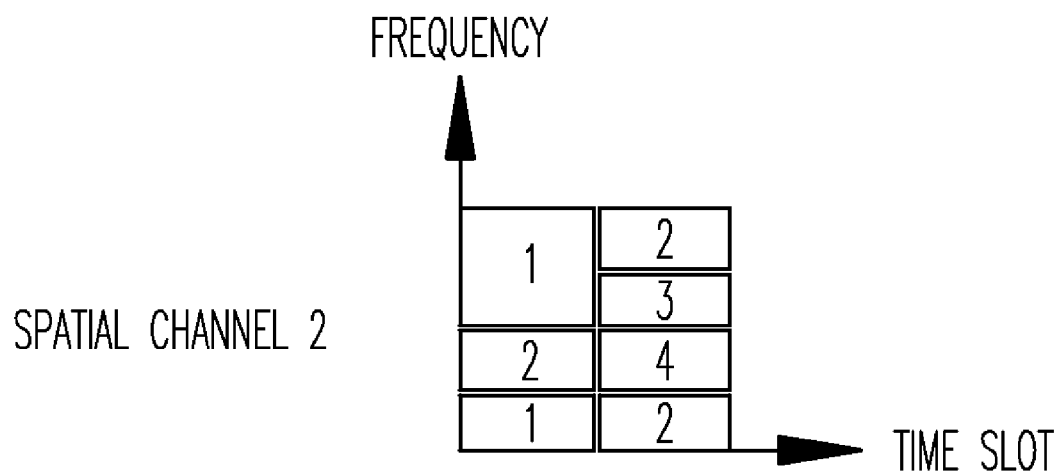

In some IEEE 802.16(e) embodiments, one subchannel may comprise a number of subcarriers (which may not be physically adjacent in the whole band) and a constant number of time slots for each subcarrier. In these embodiments, the constant number may vary with channel permutation scheme (e.g. for FUSC and PUSC, the number may be one and two respectively). A subchannel may be viewed as a rectangle in frequency and time domain as illustrated in FIGS. 2A and 2B. For band AMC channel permutations, a subchannel may comprise two rectangles adjacent in time as illustrated in FIG. 2B. The transmission resource assigned to a mobile station may be a number subcarriers and a number of time slots, which also may be viewed as a rectangle. For each spatial channel, the resource (sometimes referred to as a zone of the mobile station) may be partitioned into one or multiple subchannels. The size of the subchannel does not need to be constant, as some subchannels may have more subcarriers than the others. The filling order of subchannels may be frequency first, space second, and time last. The filling order within one spatial channel is illustrated in FIG. 2A as spatial channel 1. The blocks of rectangles for both spatial channels in FIG. 2A may denote on subchannel. All the subcarriers in FIG. 2A are not required to be contiguous.

Figure 2C:
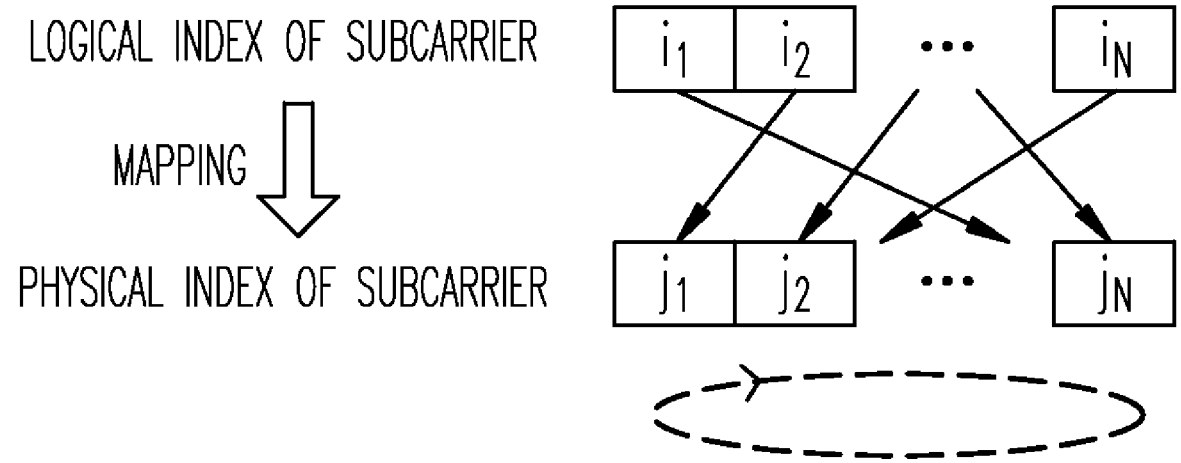
FIG. 2C illustrates mapping of logical subcarrier indices to physical subcarrier indices in accordance with some embodiments of the present invention.

In example one illustrated as reference designation 201 in FIG. 2A, frequency domain diversity may be increased and possibly maximized by rotating the subchannels in the frequency dimension for spatial channel 2 with respect to spatial channel 1. Subchannel 1 in spatial channel 1, illustrated as reference designation 204 employs subcarriers different from those of subchannel 1 in spatial channel 2, which is illustrated as reference designation 206. In actual embodiments, the corresponding (i.e. adjacent in filling order) subchannels in two spatial channels may not be able to be filled in order and may be disjoint by rotation. There may, however, still be overlap between the two spatial channels as shown in FIG. 2C, where subchannels 1 and subchannels 2 of both spatial channels overlap in frequency subcarriers. The less the corresponding subchannels overlap, the better the frequency diversity may be. In example two, illustrated as reference designation 202 of in FIG. 2A, both frequency diversity and time diversity may be increased and possibly maximized. In example two, there are two rotations. One rotation is in the frequency domain, which is the same as that in example one, and the other rotation is in the time domain. Each row in example two is rotated with respect to the corresponding row in example one.

In some embodiments, for fast fading channels that may change between time slots, time slot diversity within a user's zone may be desirable. In these embodiments, subcarrier mapping circuitry 100 may assign constellation symbols of a first subchannel of a first spatial channel to a first time slot, and may assign subsequent constellation symbols of the first subchannel of a second spatial channel to a time slot other than the first time slot. In some embodiments, when the channel is determined to be a fast fading channel, data processing circuitry 150 may determine when the multicarrier communication channel is a fast fading channel by determining when channel estimates change across time slots. In these embodiments, subcarrier mapping circuitry 110 may assign the constellation symbols of corresponding subchannel of the different spatial channels to more than one time slot.

In some embodiments, each subcarrier may be associated with a physical index. Subcarrier mapping circuitry may map a logical index of subcarriers of a subchannel to one of the physical indices of the subcarriers so that subchannels use different sets of physical subcarriers in each spatial channel.

In some embodiments, modulators 108 may be responsive to modulation level input 151 to modulate the subcarriers of each spatial channel in accordance with one of a plurality of modulation levels. In some cases, modulators 108 may apply a different modulation level for each of the spatial channels, although the scope of the invention is not limited in this respect.

In some of these embodiments, beamforming circuitry 114 may apply beamformer weights 155 in the frequency domain to the subcarriers of the spatial channels. In these embodiments, different modulation levels may be applied to different spatial channels by modulators 108 and signals transmitted by the transmit antennas 122 may exhibit directivity for each spatial channel. For example, beamforming weights 155 of each spatial channel may allow the subchannels within each spatial channel to be directed toward particular directions or subscriber stations or users, although the scope of the invention is not limited in this respect.

Although multicarrier transmitter 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of multicarrier transmitter 100 may refer to one or more processes operating on one or more processing elements.

In some embodiments, the number of subchannels may be as low as one and as great as ten or more. In some embodiments, the number of spatial channels may correspond to the number of transmit antennas 122 and may range from as little as two to up to ten or more. In some embodiments, the number of transmit antennas 122 may equal four and may use four spatial channels, although the scope of the invention is not limited in this respect.

FIG. 2C illustrates mapping of logical subcarrier indices to physical subcarrier indices in accordance with some embodiments of the present invention. In FIG. 2C, logical subcarrier indices are illustrated as $i_1$ through $i_N$ where N corresponds to the number of subcarriers, and physical subcarrier indices are illustrated as $j_1$ through $j_N$. In some embodiments, the logic index of subcarriers within each subchannel may remain unchanged but the mapping between logical to physical indexes may change. This allows the subchannel with the same index for different spatial channels to reside on distinct sets of physical subcarriers.

In some embodiments, this may be done by circularly rotating the physical indexes by an appropriate amount in which the indexes are for all the data subcarriers of a particular spatial channel and assigned to a particular subscriber. For the example, subchannel one in spatial channel 1 may employ logical index 1, 2, . . . , 24. To avoid overlap with spatial channel 1 and help maximize frequency diversity, subchannel 1 in spatial channel 2 may employ logical index 25, 26, . . . , 48. This is equivalent to circularly shifting the mapping between logical to physical indexes by 24 in spatial channel 2 as shown in FIG. 2C. In these embodiments, the amount of shift may linearly increase as spatial channel index increases. In this example, example, the shift amount for spatial channel two would be 24 and the shift amount for spatial channel three implemented by the first subchannel shifter of subcarrier mapper for the third spatial channel would be 48.

In some IEEE 802.16(d) and IEEE 802.16(e) embodiments, the number of subcarriers within the smallest subchannel may be 9, 18, 24, and 48 for different channel permutation schemes. In some of these embodiments, one of these numbers may be selected as the shift size for the second spatial channel for a corresponding channel permutation scheme (e.g., PUSC, FUSC, and band AMC), although the scope of the invention is not limited in this respect. In some alternate IEEE 802.16(d) and IEEE 802.16(e) embodiments, one of these numbers (e.g., 24), may be selected as the shift size for the second spatial channel for all channel permutation schemes, although the scope of the invention is not limited in this respect.

In some embodiments, the optimal shift size in the rotation may depends on the number of the assigned time slots, the coding scheme implemented by encoder 102 (FIG. 1), the modulation order (such as 16 QAM versus 64 QAM), and channel permutation scheme.

In some alternative embodiments of the present invention, the shift size for the second spatial channel may be the number of subcarriers in subchannel one in spatial channel one. In these embodiments, the shift size may linearly increase for the remaining of the channels, although the scope of the invention is not limited in this respect.

In some other alternative embodiments of the present invention, the shift size for the second spatial channel may be the maximum number of subcarriers over all valid subchannels (with or without the constraints such as coding scheme, modulation order, and channel permutation scheme), although the scope of the invention is not limited in this respect.

In some other embodiments, the mapping may remain the same but the filling order of the subchannels may be chanced. For example, subchannel one in spatial channel one may be filled first and then subchannel two in spatial channel two may be filled. Frequency diversity may be increased because these two subchannels may employ different sets of subcarriers. In these embodiments, the output of one of modulators 108 (FIG. 1) may couple with more than one of subcarrier mappers 110 (FIG. 1).

In some fast-fading channel situations, the channel conditions may change across time slots. In some embodiments, a time slot index may also be rotated for each spatial channel. For the example, both the subcarrier mapping and the time slot mapping may be rotated so that subchannel one in spatial channel two may be physically located on frequencies and time slots different from subchannel one in spatial channel one. In these embodiments, a large shift in the time slot dimension may provide improved time-diversity; however, this is limited by the number of assigned time slots and decoding latency requirements.

In some other embodiments, a distinct interleaver for each spatial channel may be employed in order to change the final logical to physical mapping to permute the physical subcarrier indexes.

Figure 3:
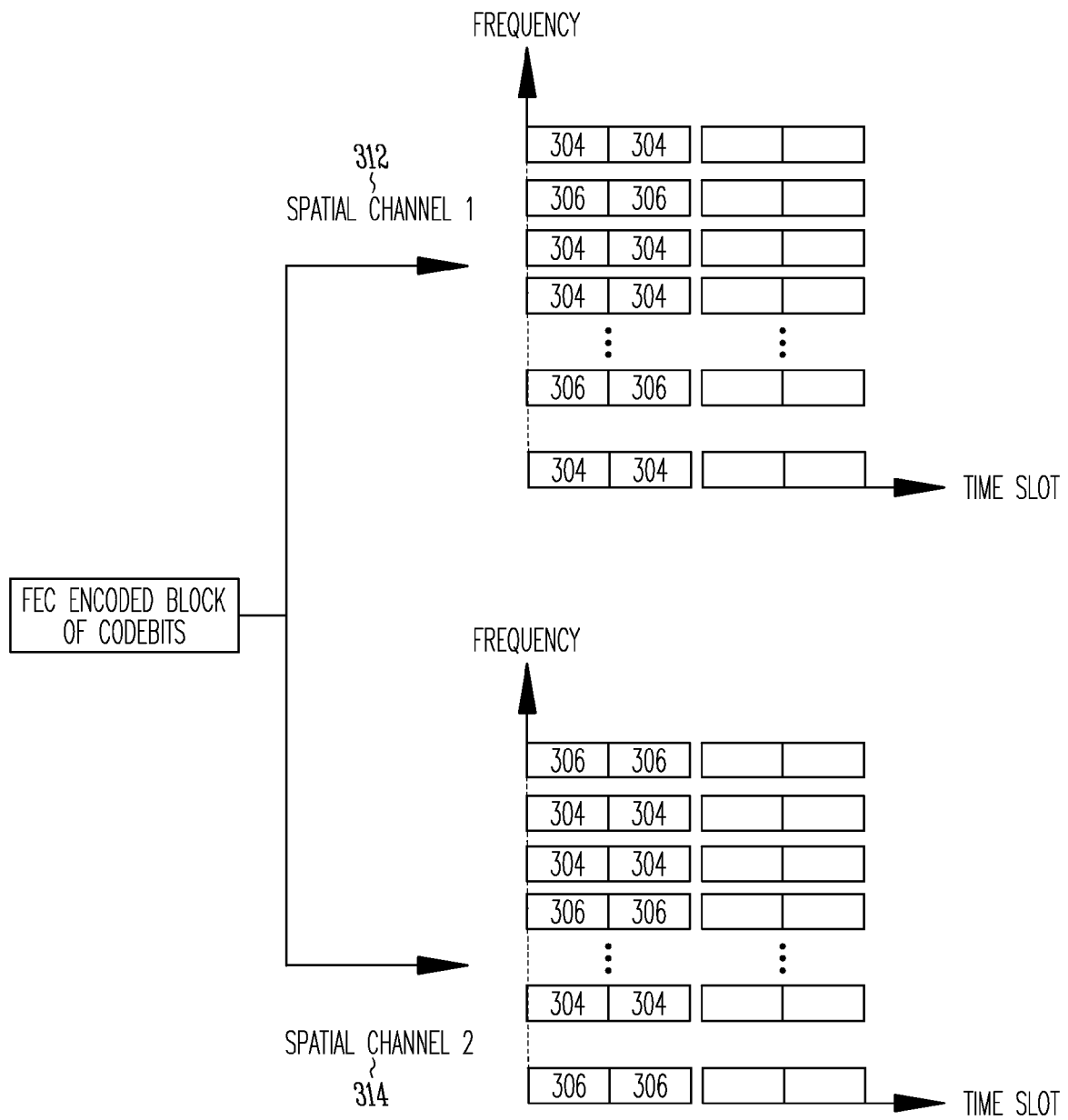
FIG. 3 illustrates mapping of the time and frequency structure of a multicarrier channel in accordance with some embodiments of the present invention.

FIG. 3 illustrates mapping of the time and frequency structure of a multicarrier channel in accordance with some embodiments of the present invention. FIG. 3 illustrates two spatial channels, spatial channel one 312 and spatial channel two 314. Each spatial channel may comprise time slots illustrated in the x-direction and subcarriers illustrated in the y-direction. In spatial channel one 312, a first subchannel may use subcarriers and time slots indicated by reference designation 304, and a second subchannel may use subcarriers and time slots indicated by reference designation 306. In spatial channel two 314, the first subchannel may use subcarriers and time slots indicated by reference designation 304 and the second subchannel may use subcarriers and time slots indicated by reference designation 306, however, in this example, the subcarriers for each subchannel in spatial channel two are circularly shifted from their locations in the spatial channel one by one subcarrier frequency. Although FIG. 3 illustrates a shift of one subcarrier frequency, the scope of the invention is not limited in this respect.

Referring back to FIG. 1, in some embodiments, multicarrier transmitter 100 may be part of a broadband communication station that may transmit orthogonal frequency division multiple access (OFDMA) communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDMA subcarriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect.

In some embodiments, the frequency spectrums for a multicarrier communication signal may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, multicarrier transmitter 100 may transmit RF communications in accordance with specific communication standards, such as the Institute of Electrical and Electronics Engineers (IEEE) standards including IEEE 802.16(d) and/or (e) standards for wireless metropolitan area networks (WMANs), although multicarrier transmitter 100 may also be suitable to transmit in accordance with other techniques. In some embodiments, multicarrier transmitter 100 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly. In some broadband and WiMax embodiments, multicarrier transmitter 100 may be part of a WiMax transmitting station.

Antennas 122 may comprise directional or omnidirectional antennas, including, for example, dipole antennas, monopole antennas, patch antennas, loop antennas, microstrip antennas or other types of antennas suitable for transmission of RF signals. The number of antennas 122 may range from as little as two to up to ten or more.

In accordance with some embodiments, multicarrier 100 (FIG. 1) may modulate the subcarriers in accordance with individual subcarrier modulation assignments, referred to as adaptive bit loading (ABL). Accordingly, a variable number of bits may be represented by a symbol and modulated on a subcarrier. Modulation assignments 151 provided to modulators 108 (FIG. 1) for the individual subchannel may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with higher data communication rates per subcarrier may also be used.

An OFDMA symbol may be viewed as the combination of the symbols modulated on the individual subcarriers of each spatial channel. Because of the variable number of bits per symbol-modulated subcarrier and the variable number of subchannels that may comprise a spatial channel, the number of bits per OFDMA symbol may vary greatly.

Embodiments of the invention may be implemented in one or a combination of hardware, firmware and software. Embodiments of the invention may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier transmitter comprising:
a modulator for each of a plurality of data streams to generate a set of constellation symbols for each of a plurality of frequency subchannels based on a number of subcarriers associated with each subchannel; and
subcarrier mapping circuitry for each of a plurality of spatial channels to assign the sets of the constellation symbols to the subcarriers of each subchannel,
wherein the subcarrier mapping circuitry is to change an order in which the constellation symbols are assigned to the subcarriers for some spatial channels without changing the number of subcarriers per spatial channel, and so that some of the subchannels use different sets of subcarriers for some spatial channels.

2. The multicarrier transmitter of claim 1 wherein the subcarrier mapping circuitry is to shift subcarrier assignments within the spatial channels of at least some but less than all spatial channels by an increasing amount for each subsequent spatial channel being assigned, the increasing amount being at least as great as a number of subcarriers comprising a first subchannel.

3. The transmitter of claim 1 wherein each subchannel comprises a subset of frequency subcarriers of a multicarrier communication channel,
wherein each subchannel is a concatenated subchannel further comprising two or more time slots, each time slot corresponding to an orthogonal frequency division multiplex access symbol time, and
wherein the subcarrier mapping circuitry is to further assign the constellation symbols of each of the subchannels to the time slots to increase time-slot diversity within an associated subchannel.

4. The transmitter of claim 3 wherein the subcarrier mapping circuitry is to assign constellation symbols of a first subchannel of a first spatial channel to a first time slot, and is to assign subsequent constellation symbols of the first subchannel of a second spatial channel to another time slot.

5. The transmitter of claim 4 further comprising data processing circuitry to determine when the multicarrier communication channel is a fast fading channel by determining when channel estimates change across time slots,
wherein the subcarrier mapping circuitry is to assign the constellation symbols of corresponding subchannel of the different spatial channels to more than one time slot.

6. The transmitter of claim 1 wherein each subcarrier has a physical index, and
wherein the subcarrier mapping circuitry is to map a logical index of subcarriers of a subchannel to one of the physical indices of the subcarriers so that subchannels use different sets of physical subcarriers in each spatial channel.

7. The transmitter of claim 1 wherein the modulators are responsive to a modulation level input to modulate the subcarriers of each spatial channel in accordance with one of a plurality of modulation levels, and
wherein the modulators are adaptable to apply a different of the modulation levels for each of the spatial channels.

8. The transmitter of claim 7 further comprising:
beamforming circuitry to apply beamformer weights in the frequency domain to the subcarriers of the spatial channels; and
a transmit antenna associated with each spatial channel,
wherein when the beamformer weights are applied to different spatial channels, subchannels of the spatial channels exhibit directivity.

9. The multicarrier transmitter of claim 1 wherein the transmitter is a WiMax multicarrier multiple-output transmitter and is part of a broadband communication station.

10. A method of transmitting multicarrier communication signals performed by a multicarrier transmitter, the method comprising:
generating a set of constellation symbols for each of a plurality of frequency subchannels based on a number of subcarriers associated with each subchannel;
assigning, for each of a plurality of spatial channels, the sets of the constellation symbols to the subcarriers of each subchannel and
modulating the assigned sets of constellation symbols for subsequent RF transmission,
wherein an order in which the constellation symbols are assigned to some spatial channels is changed without changing the number of subcarriers per spatial channel and so that some of the subchannels use different sets of subcarriers for at least some of the spatial channels.

11. The method of claim 10 further comprising shifting subcarrier assignments of the subchannels of at least some but less than all spatial channels by an increasing amount, the increasing amount being at least as great as a number of subcarriers comprising a first subchannel.

12. The method of claim 10 wherein each subchannel comprises a subset of frequency subcarriers of a multicarrier communication channel,
wherein each subchannel is a concatenated subchannel further comprising two or more time slots, each time slot corresponding to an orthogonal frequency division multiplex access symbol time, and
wherein the assigning further comprises assigning the constellation symbols of each of the subchannels to the time slots to increase time-slot diversity within an associated subchannel.

13. The method of claim 12 further comprising:
assigning constellation symbols of a first subchannel of a first spatial channel to a first time slot; and
assigning subsequent constellation symbols of the first subchannel of a second spatial channel to another time slot.

14. The method of claim 13 further comprising:
determining when the multicarrier communication channel is a fast fading channel by determining when channel estimates change across time slots; and
assigning the constellation symbols of corresponding subchannels of the different spatial channels to more than one time slot.

15. The method of claim 10 wherein each subcarrier has a physical index, and
wherein the method further comprises mapping a logical index of subcarriers of a spatial channel to one of the physical indices of the subcarriers so that corresponding subchannels of different spatial channels use different sets of subcarriers for each spatial channel.

16. The method of claim 10 further comprising modulating the subcarriers of each spatial channel in accordance with one of a plurality of modulation levels, wherein a different of the modulation levels is applied to each of the spatial channels.

17. The method of claim 16 further comprising applying beamformer weights in the frequency domain to the subcarriers of the spatial channels, wherein when the beamformer weights are applied to the different spatial channels, subchannels within the different spatial channels exhibit directivity.

18. A system comprising:
a plurality of transmit antennas, each associated with one of a plurality of spatial channels; and
a multicarrier transmitter comprising a modulator for each of a plurality of data streams to generate a set of constellation symbols for each of a plurality of frequency subchannels based on a number of subcarriers associated with each subchannel, and subcarrier mapping circuitry for each of a plurality of spatial channels to assign the sets of the constellation symbols to the subcarriers of each subchannel,
wherein the subcarrier mapping circuitry is to change an order in which the constellation symbols are assigned to the subcarriers for some spatial channels without changing the number of subcarriers per spatial channel, and so that some of the subchannels use different sets of subcarriers for some spatial channels.

19. The system of claim 18 wherein the subcarrier mapping circuitry is to shift subcarrier assignments within the spatial channels of at least some but less than all spatial channels by an increasing amount, the increasing amount being at least as great as a number of subcarriers comprising a first subchannel,
wherein each subchannel comprises a subset of frequency subcarriers of a multicarrier communication channel,
wherein each subchannel is a concatenated subchannel further comprising two or more time slots, each time slot corresponding to an orthogonal frequency division multiplex access symbol time, and
wherein the subcarrier mapping circuitry is to further assign the constellation symbols of each of the subchannels to the time slots to increase time-slot diversity within an associated subchannel.

20. The system of claim 19 wherein the subcarrier mapping circuitry is to assign constellation symbols of a first subchannel of a first spatial channel to a first time slot, and is to assign subsequent constellation symbols of the first subchannel of a second spatial channel to another time slot, and
wherein the multicarrier transmitter further comprises data processing circuitry to determine when the multicarrier communication channel is a fast fading channel by determining when channel estimates change across time slots, and
wherein the subcarrier mapping circuitry is to assign the constellation symbols of corresponding subchannel of the different spatial channels to more than one time slot.

21. The system of claim 18 wherein each subcarrier has a physical index, and
wherein the subcarrier mapping circuitry is to map a logical index of subcarriers of a subchannel to one of the physical indices of the subcarriers so that subchannels use different sets of physical subcarriers in each spatial channel.

22. A computer-readable medium that stores instructions for execution by one or more processors to perform operations comprising:
generating a set of constellation symbols for each of a plurality of frequency subchannels based on a number of subcarriers associated with each subchannel; and
assigning, for each of a plurality of spatial channels, the sets of the constellation symbols to the subcarriers of each subchannel, wherein an order in which the constellation symbols are assigned to some spatial channels is changed without changing the number of subcarriers per spatial channel and so that some of the subchannels use different sets of subcarriers for at least some of the spatial channels.

23. The computer-readable medium of claim 22 wherein the instructions, when further accessed cause the machine to perform operations further comprising shifting subcarrier assignments of the subchannels of at least some but less than all spatial channels by an increasing amount, the increasing amount being at least as great as a number of subcarriers comprising a first subchannel,
wherein each subchannel comprises a subset of frequency subcarriers of a multicarrier communication channel,
wherein each subchannel is a concatenated subchannel further comprising two or more time slots, each time slot corresponding to an orthogonal frequency division multiplex access symbol time, and
wherein the assigning further comprises assigning the constellation symbols of each of the subchannels to the time slots to increase time-slot diversity within an associated subchannel.

24. The computer-readable medium of claim 23 wherein the instructions, when further accessed cause the machine to perform operations further comprising:
assigning constellation symbols of a first subchannel of a first spatial channel to a first time slot;
assigning subsequent constellation symbols of the first subchannel of a second spatial channel to another time slot;
determining when the multicarrier communication channel is a fast fading channel by determining when channel estimates change across time slots; and
assigning the constellation symbols of corresponding subchannels of the different spatial channels to more than one time slot.

\* \* \* \* \*

UNITED STATES PATENT AND TRADEMARK OFFICE
CERTIFICATE OF CORRECTION

PATENT NO. : 7,616,704 B2 Page 1 of 1
APPLICATION NO. : 11/075030
DATED : November 10, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1282 days.

Signed and Sealed this

Nineteenth Day of October, 2010

David J. Kappos
*Director of the United States Patent and Trademark Office*